United States Patent
Shinoski

(10) Patent No.: US 7,489,844 B2
(45) Date of Patent: Feb. 10, 2009

(54) RUGGEDIZED DEEP-SEA ROV DEPLOYMENT CABLE

(75) Inventor: Jarrett Shinoski, Hickory, NC (US)

(73) Assignee: Commscope, Inc. of North Carolina, Hickory, NC (US)

( * ) Notice: Subject to any disclaimer, the term of this patent is extended or adjusted under 35 U.S.C. 154(b) by 0 days.

(21) Appl. No.: 11/621,013

(22) Filed: Jan. 8, 2007

(65) Prior Publication Data

US 2008/0166093 A1    Jul. 10, 2008

(51) Int. Cl.
  *G02B 6/44*    (2006.01)
(52) U.S. Cl. .................................. 385/113; 385/109
(58) Field of Classification Search .................. None
  See application file for complete search history.

(56) References Cited

U.S. PATENT DOCUMENTS

| | | | |
|---|---|---|---|
| 4,659,174 A | | 4/1987 | Ditscheid et al. |
| 4,859,024 A | * | 8/1989 | Rahman ..................... 385/112 |
| 4,893,893 A | | 1/1990 | Claxton et al. |
| 5,382,433 A | * | 1/1995 | Pahlck et al. ............... 424/401 |
| 5,509,097 A | * | 4/1996 | Tondi-Resta et al. ........ 385/113 |
| 5,627,932 A | | 5/1997 | Kiel et al. |
| 5,905,833 A | * | 5/1999 | Sheu ......................... 385/109 |
| 5,917,978 A | * | 6/1999 | Rutterman ................. 385/109 |
| 5,920,671 A | * | 7/1999 | Smith ........................ 385/102 |
| 6,160,939 A | * | 12/2000 | Sheu ......................... 385/109 |
| 6,311,000 B1 | * | 10/2001 | Schneider ................... 385/113 |
| 6,611,646 B1 | * | 8/2003 | Norris et al. ............... 385/113 |
| 7,024,081 B2 | * | 4/2006 | Dowd et al. ................ 385/109 |
| 7,035,511 B1 | * | 4/2006 | Rhoney et al. ............. 385/100 |
| 7,092,605 B2 | | 8/2006 | Adams et al. |
| 2002/0041743 A1 | * | 4/2002 | Schneider et al. ........... 385/101 |
| 2004/0105634 A1 | * | 6/2004 | Bosisio et al. .............. 385/100 |

OTHER PUBLICATIONS

United States Navy, Navy Electricity and Electronics Training Series—Module 24—Introduction to Fiber Optics, Sep. 1998, Naval Education and Training Professional Develpoment and Technology Center, 14196, 2-10 and 2-11.*
Simon Bacal, "Deep Water Discovery," www.realscreen.com/articles/magazine/20021001/bismarck.html, Oct. 1, 2002.
Dave Horrigan, "Filming the Seas' Great Depths," www.wired.com/news/technology/1,51040-0.html, Mar. 28, 2002.
Edward C. Cargile, "Titanic ROV Designer/Builder," Flagship, vol. 5, No. 2, www.mts-sandiego.org, Feb. 2002.
Ross Anthony, "Titanic Revisited Ghosts of the Abyss," www.rossanthony.com/G/ghostab.shtml, 2001.
Anonymous, "San Diego" The Marine Technology Society, www.mtsociety.org/publications/currents/mar_apr_2002/sections_members.cfm, Mar./Apr. 2002.
Anonymous, "Spiderbot™ Specfications," Brochure by Oceaneering International, Inc., www.oceaneering.com, undated.

* cited by examiner

*Primary Examiner*—Sung H Pak
*Assistant Examiner*—Chad H Smith
(74) *Attorney, Agent, or Firm*—Muncy, Geissler, Olds & Lowe, PLLC

(57) ABSTRACT

A robust fiber optic cable, which is well suited for harsh environments, such as undersea environments when attached as a tether to a mobile undersea vehicle includes an optical fiber loosely surrounded by an inner containment tube. A suspension fluid is disposed between the inner containment tube and the optical fiber. A plurality of strength members surrounds the inner containment tube, and an outer jacket surrounds said plurality of strength members. In preferred embodiments, the outer jacket is bonded to the strength members and/or the inner containment tube.

12 Claims, 8 Drawing Sheets

RUGGEDIZED DEEP-SEA ROV DEPLOYMENT CABLE

BACKGROUND OF THE INVENTION

1. Field of the Invention

The present invention relates to communication cables. More particularly, the present invention relates to a fiber optic cable, suitable for connection to a moving object used in deep-sea exploration.

2. Description of the Related Art

A remotely operated underwater vehicle (ROV) is known in the prior art. An ROV is typically operated by a person aboard a ship or submarine, and is tethered to the ship or submarine by at least a power cable and a communication cable. The power cable supplies power for ROV motors, lights, cameras, manipulation arms, etc. The communication cable carries control signals to the ROV for maneuvering the ROV, and information signals from the ROV to the operator, such as video signals, sound signals, temperature readings, equipment diagnostic signals, etc.

An ROV can be used to investigate and retrieve samples of undersea plant and animal life, and to explore and retrieve wreckage at the bottom of the sea. An ROV is also useful to inspect and repair undersea pipelines, cables, structures of an oil rig or dock, a hull of a seagoing ship or submarine, etc.

The undersea environment of an ROV is harsh, with the presence of salt water, water current forces, temperature extremes, rapid temperature fluctuations, extreme pressure, and the physical encountering of foreign objects. Therefore, there exists a need for a communication cable which is particularly immune to the undersea environment and which can perform well as the ROV undertakes its various undersea tasks.

Fiber optic cables are excellent communication cables. Fiber optic cables are capable of high-speed data communication over an extended bandwidth with very low attenuation over long cable distances. Various fiber optic cable designs are known.

For example, U.S. Pat. No. 5,627,932 of the present assignee illustrates a reduced diameter indoor fiber optic cable. As illustrated in FIGS. 1-2, the first prior art cable 10 includes a single optical fiber 11, containing a core and a cladding layer surrounding the core, with one or more polymer coatings applied over the cladding, such that the optical fiber 11 assumes a diameter of 250 um. The optical fiber 11 is surrounded and bonded to a coating or tight buffer layer 12, wherein the outer diameter of the tight buffer layer 12 is 500 um. A layer of loose tensile strength members 13 surround the tight buffer layer 12. Finally, an outer jacket 14 surrounds the strength members 13 and has an outer diameter of not greater than 1500 um. The tight buffer layer 12 and the outer jacket 14 are formed of polyvinyl chloride (PVC).

U.S. Pat. No. 5,627,932 also illustrates a reduced diameter indoor fiber optic cable having two optical fibers. As illustrated in FIGS. 3-4, the second prior art cable 20 includes two optical fibers 21, each containing a core and a cladding layer surrounding the core, with one or more polymer coatings applied over the cladding, such that the optical fiber 21 assumes a diameter of 250 um. The optical fibers 21 are each surrounded and bonded to a coating or tight buffer layer 22, wherein the outer diameter of the tight buffer layer 22 is 500 um. A layer of loose tensile strength members 23 surround the two tight buffer layers 22. Finally, an outer jacket 24 surrounds the strength members 23 and has an outer diameter of not greater than 2000 um. The tight buffer layers 22 and the outer jacket 24 are formed of PVC.

CommScope, Inc., the assignee of the present invention, presently markets a fiber optic cable similar to the one illustrated in FIGS. 1-2, known as a riser simplex cable. FIGS. 5 and 6 illustrate the riser simplex cable 30. The optical fiber 31 contains a core and a cladding layer surrounding the core, with one or more polymer coatings applied over the cladding, such that the optical fiber assumes a diameter of 250 um. The optical fiber 31 is surrounded and bonded to a coating or tight buffer layer 32, wherein the outer diameter of the tight buffer layer 32 is 900 um (instead of 500 um, as discussed above). A layer of loose tensile strength members, in the form of aramid yarn 33, surround the tight buffer layer 32. Finally, an outer jacket 34 surrounds the aramid yarn 33 and has an outer diameter of not greater than 2900 um. The outer jacket 34 and tight buffer layer 32 may be formed of PVC or low smoke zero halogen compounds (LSZH).

The cables described above in conjunction with FIGS. 1-6 are well suited for indoor use, but are not suitable for undersea use. Several years ago, CommScope, the assignee of the present invention, marketed an undersea cable 60 similar to the one illustrated in FIGS. 3-4, which was modified for undersea use. FIGS. 7 and 8 illustrate the undersea cable 60, which includes two optical fibers 61, each containing a core 62 and a cladding layer 63 surrounding the core 62, with one or more polymer coatings 64 applied over the cladding layer 64, such that the optical fiber 61 assumes a diameter of 250 um. The optical fibers 61 are not surrounded by a coating or tight buffer layer (like buffer layer 22 in FIGS. 3 and 4). Rather, the optical fibers 61 are directly surrounded by loose tensile strength members 65 and a Carnation light mineral oil 66. Finally, an outer jacket 67 surrounds the strength members 65 and Carnation light mineral oil 66.

Applicants appreciated drawbacks in the undersea cable 60 of FIGS. 7-8. For example, the undersea cable 60 was susceptible to signal attenuation, because two optical fibers 61 are suspended alongside each other and strength members 65, which can lead to a micro-bend situation. A micro-bend occurs when an optical fiber incurs a sharp deformation when pressed against an adjacent solid or semi-solid object (e.g., the adjacent optical fiber 61 or one or more strength members 65). The deformation can result in significant signal loss, e.g. light escapes through the cladding layer 63 at the point of the deformation, which leads to an overall signal attenuation.

Also, Applicants appreciated a need in the art for a new design of undersea cable with an improved hockling resistance and tensile strength and better protection for the optical fiber, as compared to the undersea cable 60. Hockling is the formation of spiral loops in the cable when lengthwise tension is relaxed.

SUMMARY OF THE INVENTION

It is an object of the present invention to provide a very robust fiber optic cable, which is well suited for harsh environments, such as undersea environments when attached as a tether to a mobile undersea vehicle.

This and other objects are accomplished by a fiber optic cable comprising: an optical fiber; an inner containment tube surrounding said optical fiber; a plurality of strength members at least partially surrounding said inner containment tube; and an outer jacket surrounding said plurality of strength members, wherein said outer jacket is bonded to or encapsulates said strength members.

This and other objects are also accomplished by a fiber optic cable comprising: an optical fiber; a suspension fluid surrounding said optical fiber; an inner containment tube loosely surrounding said optical fiber and said suspension fluid; a plurality of strength members at least partially surrounding said inner containment tube; and an outer jacket surrounding said plurality of strength members.

This and other objects are further accomplished by a fiber optic cable comprising: an optical fiber; an inner containment tube surrounding said optical fiber; a plurality of strength members at least partially surrounding said inner containment tube; and an outer jacket surrounding said plurality of strength members, wherein at least one portion of said outer jacket is bonded to said inner containment tube.

This and other objects are further accomplished by a fiber optic cable consisting essentially of: a single optical fiber; a suspension fluid surrounding said optical fiber; an inner containment tube loosely surrounding said optical fiber and said suspension fluid; a plurality of strength members at least partially surrounding said inner containment tube; and an outer jacket surrounding said plurality of strength members.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

Figure 1:
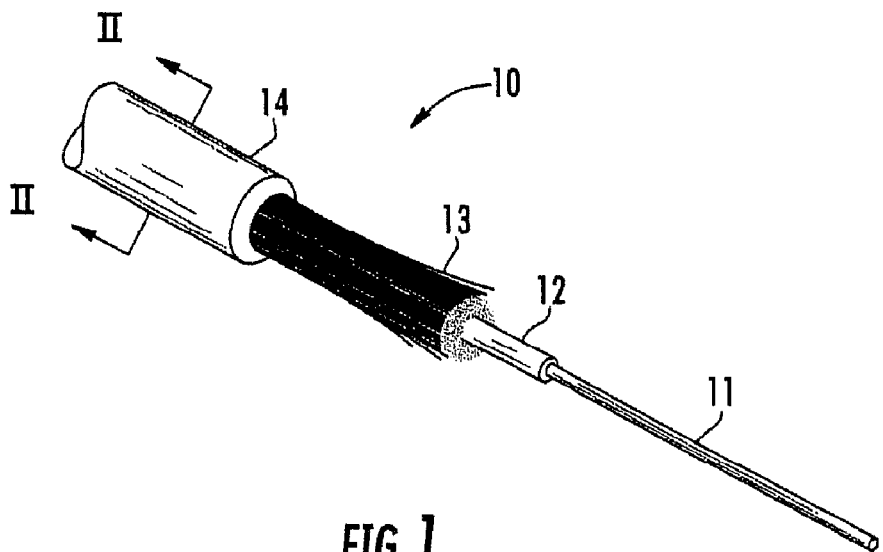
FIG. 1 is a perspective view of a first fiber optic cable, in accordance with the background art.
Figure 2:
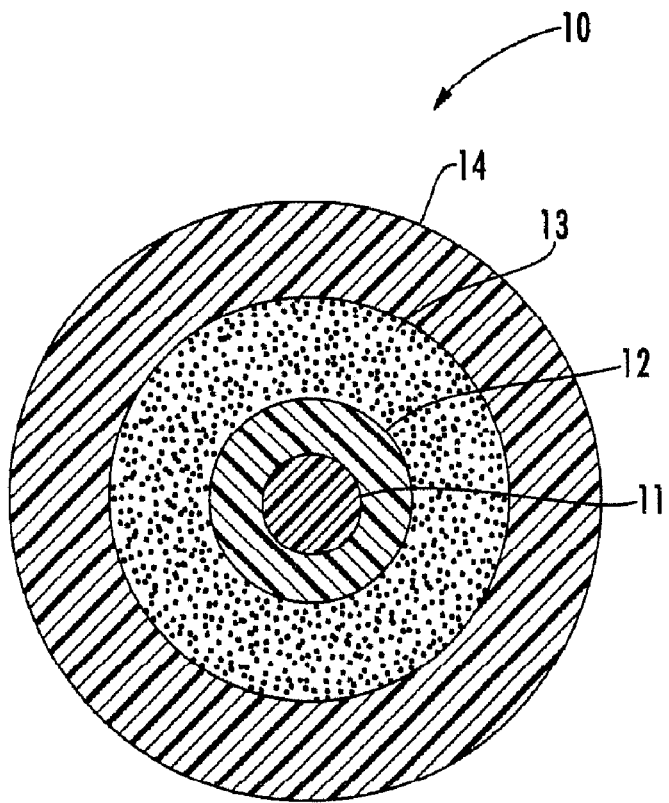
FIG. 2 is a cross section view taken along line II-II in FIG. 1.
Figure 3:
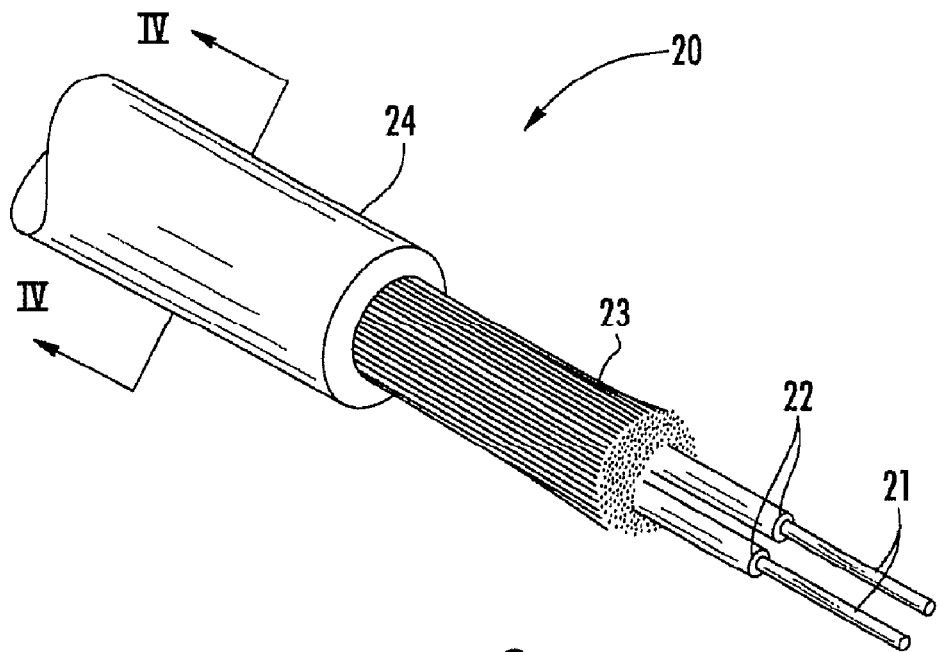
FIG. 3 is a perspective view of a second fiber optic cable, in accordance with the background art.
Figure 4:
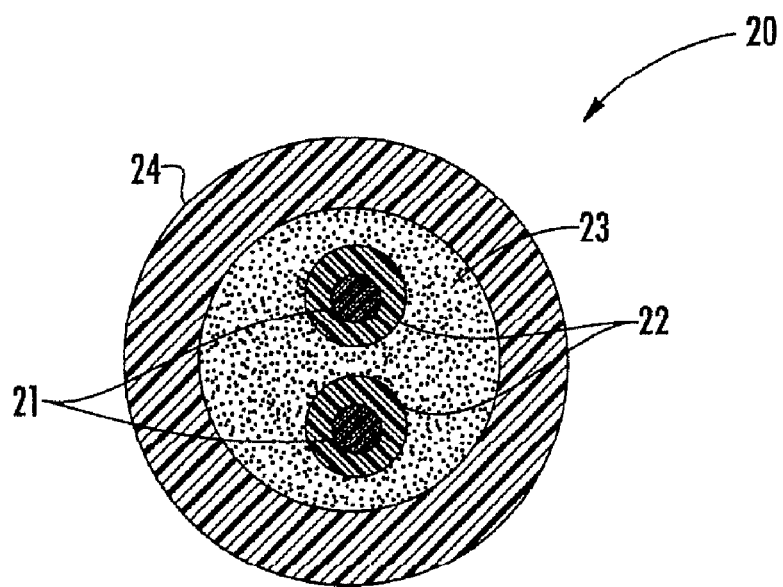
FIG. 4 is a cross section view taken along line IV-IV in FIG. 3.
Figure 5:
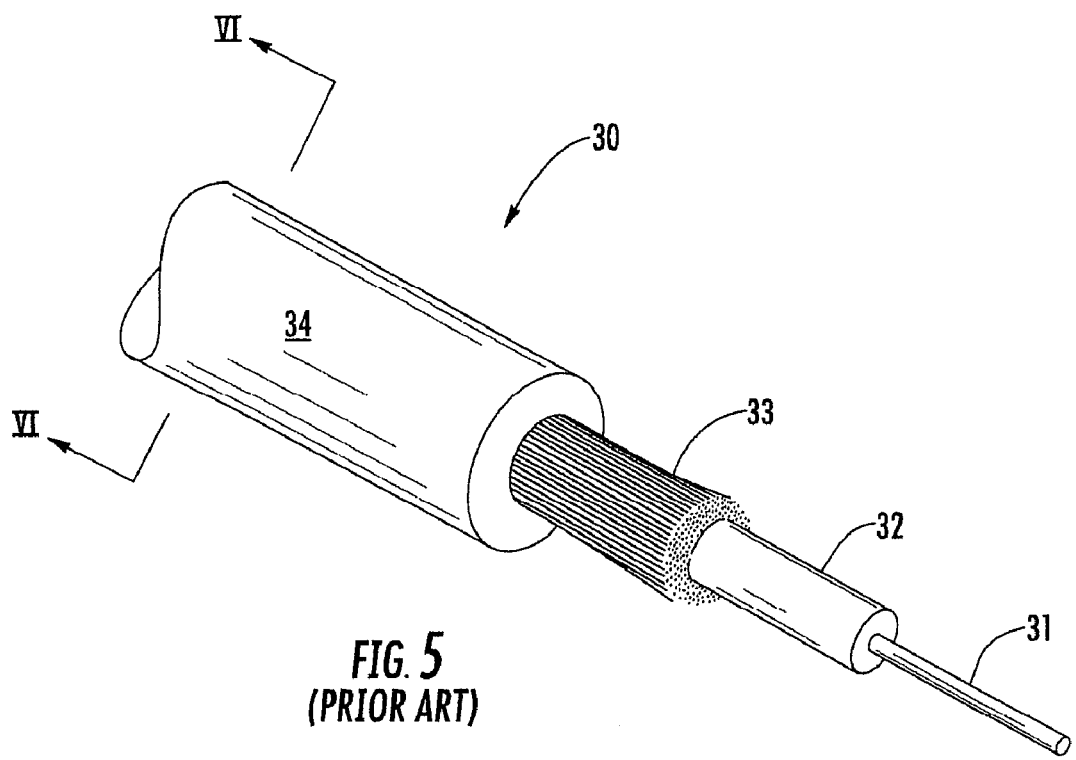
FIG. 5 is a perspective view of a third fiber optic cable, in accordance with the background art.
Figure 6:
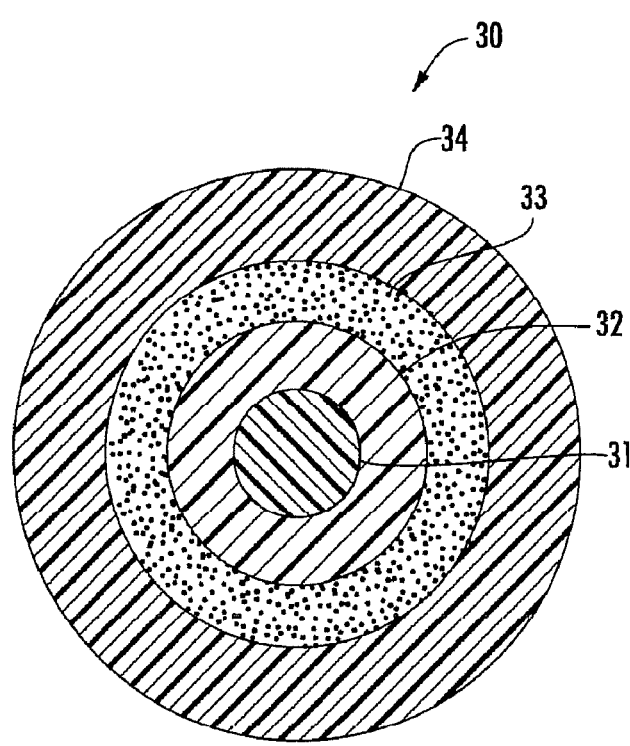
FIG. 6 is a cross section view taken along line VI-VI in FIG. 5.
Figure 7:
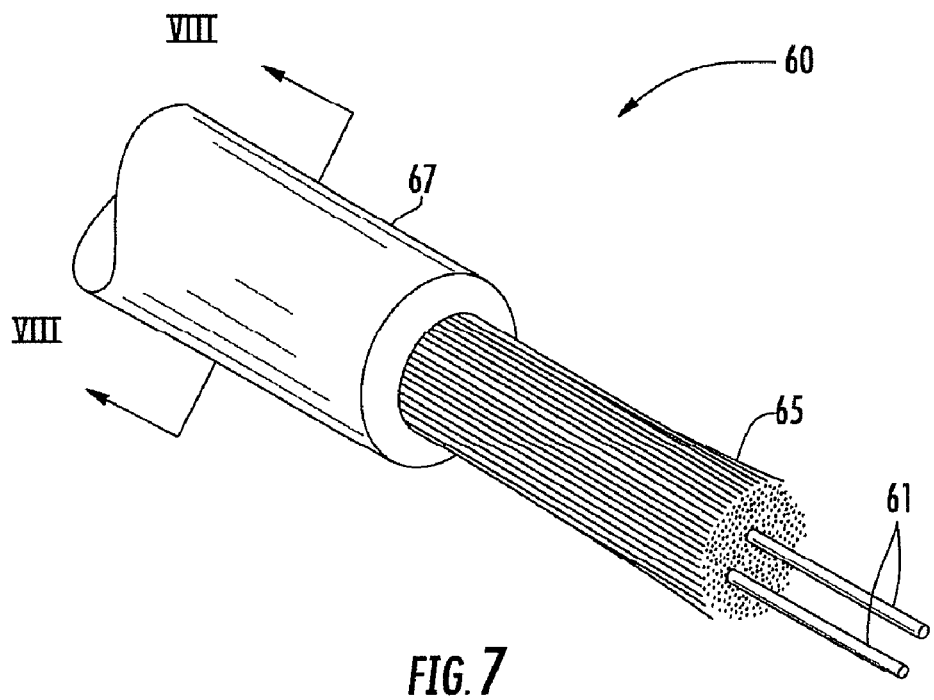
FIG. 7 is a perspective view of a fourth fiber optic cable, in accordance with the background art.
Figure 8:
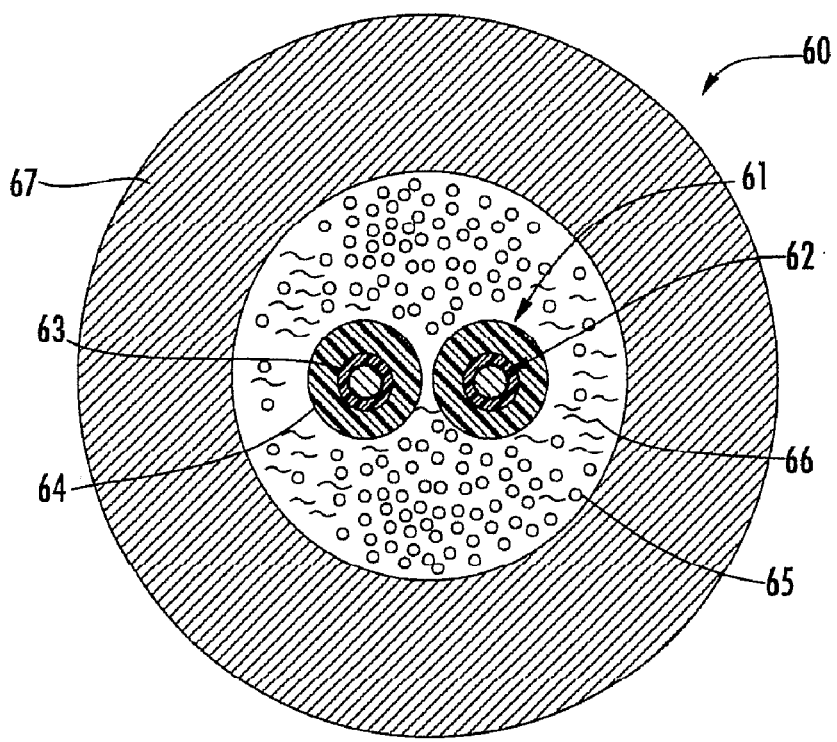
FIG. 8 is a cross section view taken along line VIII-VIII in FIG. 7.
Figure 9:
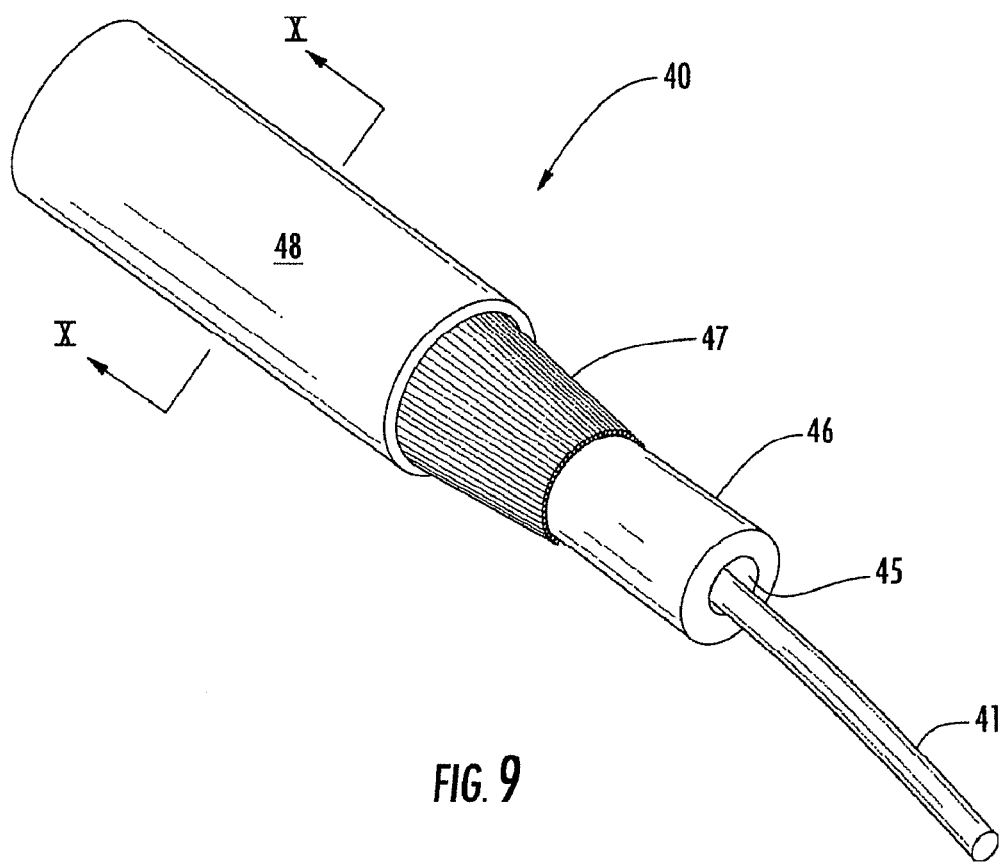
FIG. 9 is a perspective view of fiber optic cable, in accordance with a first embodiment of the present invention.
Figure 10:
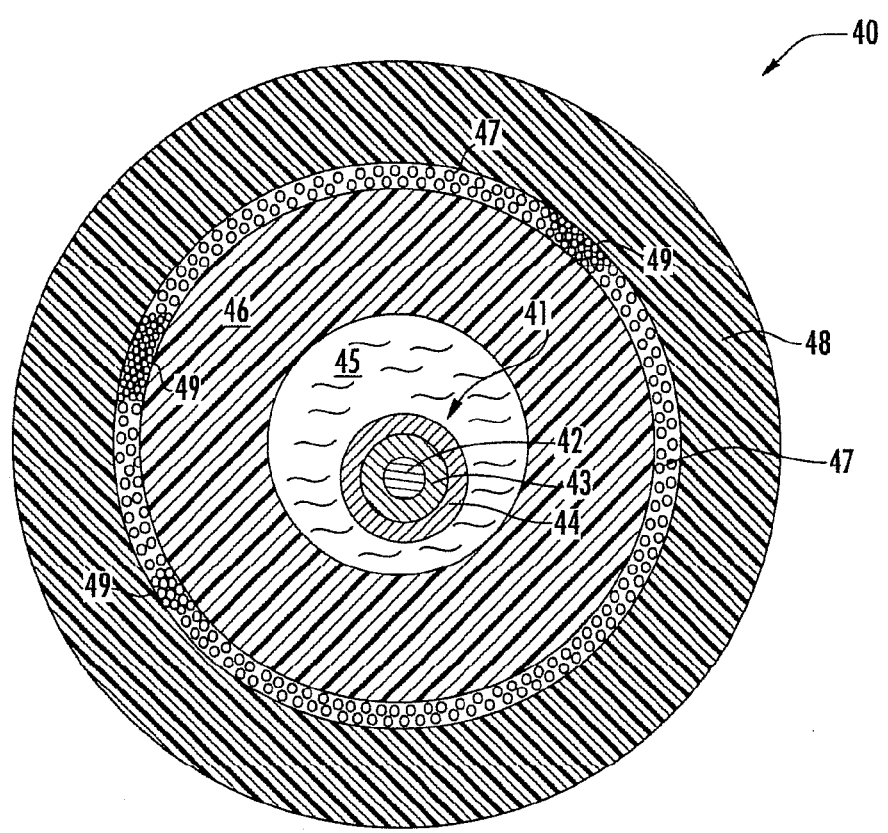
FIG. 10 is a cross section view taken along line X-X in FIG. 9.

FIGS. 9 and 10 illustrate a fiber optic cable 40, in accordance with a first embodiment of the present invention. The fiber optic cable 40 includes a single optical fiber 41, containing a core 42 and a cladding layer 43 surrounding the core, with one or more polymer coatings 44 applied over the cladding layer 43, such that the optical fiber 41 assumes a diameter of 250 um.

A suspension liquid 45 surrounds the optical fiber 41. In a preferred embodiment, the suspension liquid 45 is a form of Carnation light mineral oil. It is possible that other types of suspension fluids besides pure mineral oil could be substituted, such as a blend of oil and silica, like Gel R-1871, as manufactured by Master Adhesives of Norcross, Ga. However, it is believed that pure Carnation mineral oil is best suited for the fiber optic cable 40, as gels are more problematic in the manufacturing of the fiber optic cable 40 due to the more viscous nature of the gel.

An inner containment tube 46 surrounds and contains the suspension fluid 45. In a preferred embodiment, the inner containment tube 46 has an inner diameter of 1.0 mm or less and an outer diameter of 1.5 mm or less; more preferably, the inner diameter is 0.75 mm or less and the outer diameter is 1.0 mm or less. For example, the inner containment tube 46 could have an inner diameter of about 0.5 mm and an outer diameter of about 0.75 mm, giving the inner containment tube 46 a wall thickness of about 0.25 mm. The inner diameter of the inner containment tube 46 is larger than the outer diameter of the optical fiber 41 to create a very loose containment of the optical fiber 41. Preferably, the inner diameter of the inner containment tube 46 is at least about twice the outer diameter of the optical fiber 41.

In a preferred embodiment, the inner containment tube 46 is formed of polyvinylidene fluoride (PVDF), such as DYNEON™ 31508/003, available from Dyneon LLC of Oakdale, Minn., a 3M Company. It is possible that other types of materials could be used to form the inner containment tube 46, such as polyvinylchloride (PVC), polybutyl terephthalate (PBT), polyethylene (PE) and mixtures and co-polymers thereof, such as medium density polyethylene (MDPE), linear low density polyethylene (LLDPE), low density polyethylene (LDPE), and high density polyethylene (HDPE).

A plurality of strength members 47 surrounds the inner containment tuber 46. In a preferred embodiment, the strength members 47 are thin fibers, which extend in a linear direction of the inner containment tube 46 or are helically wound about the inner containment tube 46. The depth of the layer of strength members 47 surrounding the inner containment tube 46 is very small, preferably less than 250 um and perhaps less then 100 um, so as to place the outer diameter of inner containment tube 46 close to an inner diameter of an outer jacket 48, as will be discussed below.

In a preferred embodiment, the strength members are thin fibers formed of KELVAR™ aramid yarn, or are formed of VECTRAN™ 400 denier 150C, as manufactured by Hoechst Celanese. It is possible that other types of materials could be used to form the strength members 47, such as fiberglass or ZYLON™, as manufactured by Toyobo.

The outer jacket 48 surrounds the strength members 47. In a preferred embodiment, the outer jacket 48 has an inner diameter of 1.75 mm or less and an outer diameter of 2 mm or less; more preferably, the inner diameter is 1.25 mm or less and the outer diameter is 1.5 mm or less. For example, the outer jacket 48 could have an inner diameter of about 1.0 mm and an outer diameter of about 1.25 mm, giving the outer jacket 48 a wall thickness of about 0.25 mm. The inner diameter of the outer jacket 48 is larger than the outer diameter of the inner containment tube 46 to create a very small gap therebetween to receive the strength members 47.

In a preferred embodiment, the outer jacket 48 is formed of polyvinylidene fluoride (PVDF), such as DYNEON™ 31508/003, available from Dyneon LLC of Oakdale, Minn., a 3M Company. It is possible that other types of materials could be used to form the outer jacket 48, such as polyvinylchloride (PVC), polybutyl terephthalate (PBT), polyethylene (PE) and mixtures and co-polymers thereof, such as medium density polyethylene (MDPE), linear low density polyethylene (LL-DPE), low density polyethylene (LDPE), and high density polyethylene (HDPE).

Figure 11:
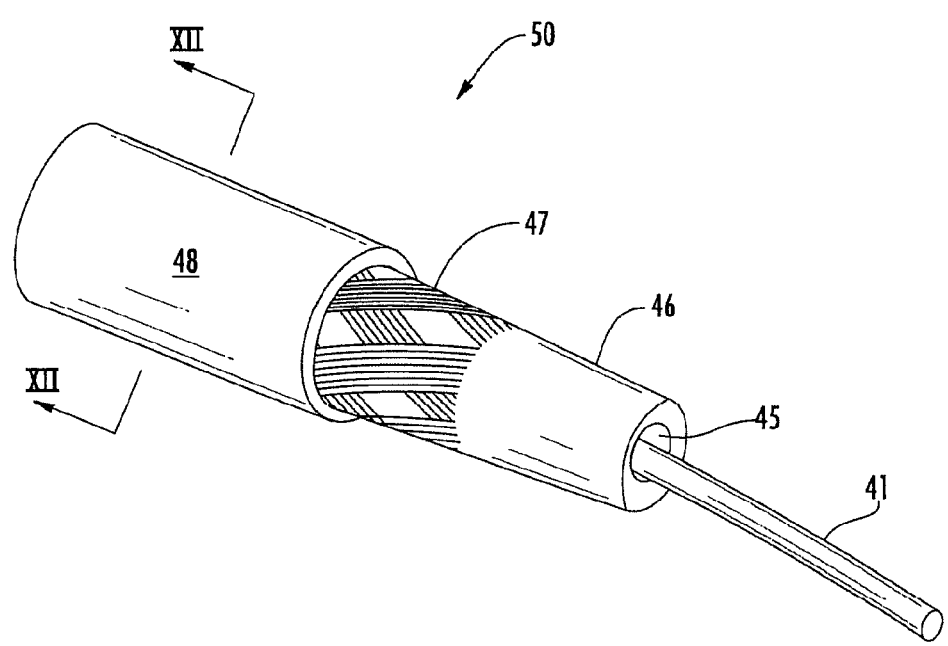
FIG. 11 is a perspective view of fiber optic cable, in accordance with a second embodiment of the present invention.
Figure 12:
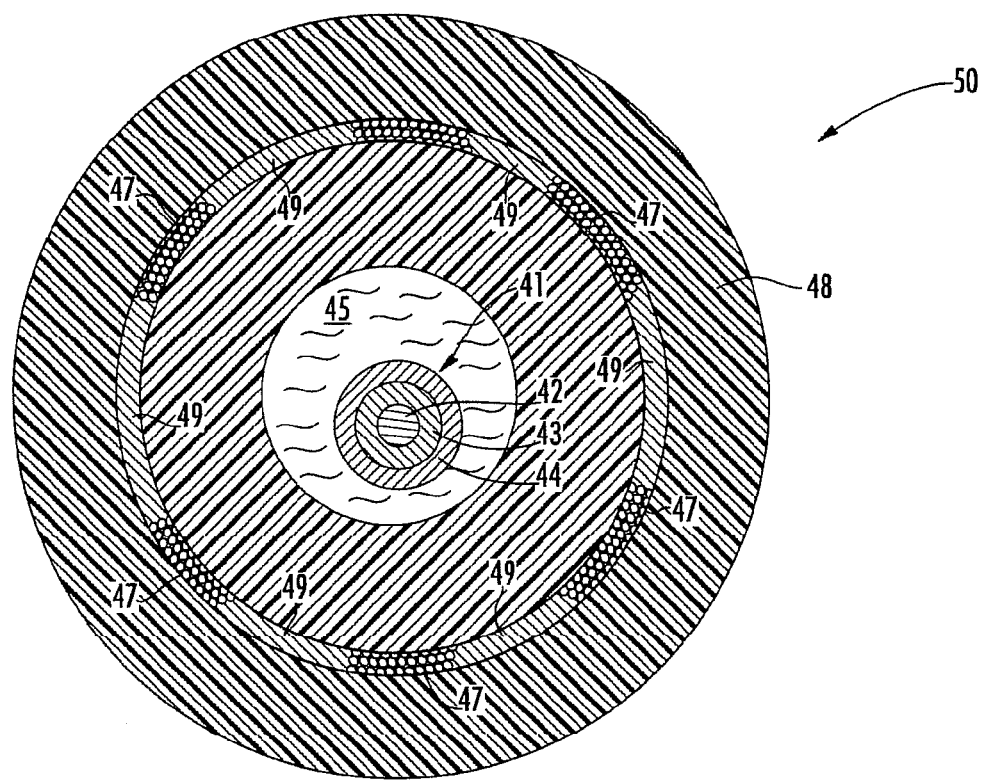
FIG. 12 is a cross section view taken along line XII-XII in FIG. 11.

FIGS. 11 and 12 illustrate a fiber optic cable 50, in accordance with a second embodiment of the present invention. The fiber optic cable 50 of the second embodiment is identical to the fiber optic cable 40 of the first embodiment, except for a braiding of the strength members 47, as discussed below.

Specifically, the fiber optic cable 50 includes the single optical fiber 41, containing the core 42 and the cladding layer 43 surrounding the core, with one or more polymer coatings 44 applied over the cladding layer 43, such that the optical fiber 41 assumes a diameter of 250 um. The suspension liquid 45 surrounds the optical fiber 41. The inner containment tube 46 surrounds and contains the suspension fluid 45. The plurality of strength members 47 surrounds the inner containment tuber 46. However, in the second embodiment, the strength members 47 are thin fibers, which are braided into groups about the inner containment tube 46.

The braiding of thin wires is known in the coaxial cable art, for forming shielding layers for coaxial cables. It is envisioned that the same or similar techniques could be used to braid the strength members 47 (e.g., aramid yarn fibers) as employed in the preferred embodiment of the present invention. The depth of the braided layer of strength members 47 surrounding the inner containment tube 46 remains very small, preferably less than 250 um and perhaps less than 100 um, so as to place the outer diameter of inner containment tube 46 close to the inner diameter of the outer jacket 48.

Now a manufacturing process for the fiber optic cables 40 and 50 of FIGS. 9-12 will be described. A preexisting optical fiber 41 is unwound from a spool and passes through an extrusion head. The inner containment tube 46 is extruded over the optical fiber 41, as pre-heated suspension fluid 45 is injected via a needle at the extrusion point. The needle acts to inject the suspension fluid 45 and guide the optical fiber 41. Injection needles and techniques to insert gels, such as those made by Master Adhesives, into the strength fibers of a fiber optic cable surrounding a buffer tube are known in the art, and such known techniques may be employed to insert the Carnation mineral oil into the inner containment tube around the optical fiber 41, instead of outside of the buffer tube.

The strength members 47 are fed from a spool onto the outer surface of the inner containment tube 46, either as single fibers (as illustrated in FIGS. 9-10) or as braided fibers (as illustrated in FIGS. 11-12). Then, the outer jacket 48 is extruded over the strength members 47. In a preferred embodiment, the extrusion process of the outer jacket 48 causes the outer jacket 48 to flow around the strength members 47 to encapsulate and bond to the strength members 47. In a more preferred embodiment, the outer jacket 48 also forms a bond with the inner containment tube 46, which is formed of a same material as the outer jacket 48. The inner containment tube 46 may be heated to improve the bonding of the outer jacket 48 with the inner containment tube 46

Various points of bonding between the outer jacket 48 and the inner containment tube 46 are illustrated by reference numerals 49 in FIGS. 10 and 12. In FIG. 10, the bonding points 49 occur around individual strength members 47 or small groups of strength members 47. Although only several points of bonding 49 are illustrated in FIG. 10, it is envisioned that the outer jacket 48 would be bonded to the inner containment tube 46 at numerous points, substantially around the entire outer diameter of the inner containment tube 46 to encapsulate the strength members 47. In FIG. 12, the bonding points 49 occur between braided groupings of the strength members 47, and could also occur between the fibers within the braided groupings of strength members 47.

The encapsulation of the strength members 47 and the bonding of the outer jacket 48 to the inner containment tube 46 runs counter to standard design parameters for fiber optic cables, as the design would create difficulty in removing the outer jacket 48 for attaching a connector, and could negatively impact on the flexibility of and coiling of the fiber optic cable. However, the fiber optic cable design of the present invention has been discovered by the Applicant to be particularly well suited for undersea usage.

An important improvement over prior art cables is the reduced susceptibility of the fiber optic cable 40, 50 of the present invention to signal attenuation. Because the optical fiber 41 is suspended in the suspension fluid 45 alone inside of the containment tube 46, there are no other adjacent structures to create a micro-bend situation. A micro-bend occurs when an optical fiber incurs a sharp deformation when pressed against an adjacent solid or semi-solid object. The deformation can result in significant signal loss, e.g. light escapes through the cladding layer at the point of the deformation, which leads to an overall signal attenuation. The reduced signal attenuation of the fiber optic cable 40, 50 of the present invention allows reliable transmission of signals up to 2 miles and beyond.

The fiber optic cable design of the present invention may have a high level of hockling resistance and a high level of tensile strength. Hockling is the formation of spiral loops in the cable when lengthwise tension is relaxed. The hockling resistance and tensile strength of the present invention can be attributed to the bonding between the inner containment tube 46 and the outer jacket 48, or can be attributed to the close tolerance between the inner containment tube 46 and the outer jacket 48, if bonding is not present.

Also, there may be increased protection for the optical fiber 41, as it is protected by three layers of materials, e.g. the outer jacket 48, the strength members 47 and the inner containment tube 46.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

I claim:

1. A fiber optic cable comprising:
an optical fiber;
an inner containment tube loosely surrounding said optical fiber;
a suspension fluid disposed between said inner containment tube and said optical fiber;
a plurality of strength members at least partially surrounding said inner containment tube; and
an outer jacket surrounding said plurality of strength members, wherein said outer jacket is bonded to or encapsulates said strength members, wherein at least portions of said outer jacket are directly bonded to said inner containment tube, wherein said outer jacket and said inner containment tube are formed of a same material, and wherein said outer jacket and said inner containment tube are formed of polyvinylidene fluoride (PVDF).

2. The fiber optic cable of claim 1, wherein said outer jacket is directly bonded to substantially all of an outer surface of said inner containment tube to encapsulate substantially all of said strength members.

3. The fiber optic cable of claim 1, wherein said suspension fluid includes light mineral oil.

4. The fiber optic cable of claim 1, wherein said plurality of strength members are braided about each other.

5. The fiber optic cable of claim 1, wherein said strength members are formed of a material selected from the group consisting of: aramid yarn and fiberglass.

6. The fiber optic cable of claim 1, wherein said optical fiber is a singlemode optical fiber.

7. The fiber optic cable of claim 1, wherein said optical fiber includes:
   a transmissive core,
   a cladding layer surrounding said core, and
   a protective coating surrounding said cladding layer.

8. The fiber optic cable of claim 7, wherein said transmissive core is a glass core approximately 9 um in diameter, said cladding layer is approximately 125 um in diameter, and said protective layer includes one or more acrylate coatings forming an overall diameter of approximately 250 um for the optical fiber.

9. The fiber optic cable of claim 1, wherein an outer diameter of said outer jacket is approximately 0.06 inches.

10. The fiber optic cable of claim 1, wherein an inner diameter of said inner containment tube is about 1 mm or less.

11. The fiber optic cable of claim 1, wherein an outer diameter of said inner containment tube is about 1.5 mm or less.

12. The fiber optic cable of claim 1, wherein said suspension fluid consists of light mineral oil.

* * * * *